(12) United States Patent
Tantawi

(10) Patent No.: US 8,024,278 B2
(45) Date of Patent: Sep. 20, 2011

(54) SYSTEM FOR DYNAMIC PERFORMANCE MODELING OF COMPUTER APPLICATION SERVICES USING A SERIAL PARALLEL QUEUEING NETWORK (SPQN) MODELER

(75) Inventor: Asser Nasreldin Tantawi, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 828 days.

(21) Appl. No.: 12/062,828

(22) Filed: Apr. 4, 2008

(65) Prior Publication Data

US 2009/0254497 A1    Oct. 8, 2009

Related U.S. Application Data

(63) Continuation of application No. 11/426,089, filed on Jun. 23, 2006, now Pat. No. 7,493,249.

(51) Int. Cl.
   *G06F 17/00* (2006.01)
(52) U.S. Cl. ............. 706/46; 703/22; 709/224; 370/412
(58) Field of Classification Search .................... 706/12, 706/45–48, 62; 703/1–2, 22; 709/224; 370/412–418
   See application file for complete search history.

(56) References Cited

U.S. PATENT DOCUMENTS

| | | | |
|---|---|---|---|
| 5,668,717 A | 9/1997 | Spall | |
| 5,764,915 A | 6/1998 | Heimsoth | |
| 5,809,235 A | 9/1998 | Sharma | |
| 5,938,733 A | 8/1999 | Heimsoth | |
| 6,182,109 B1 | 1/2001 | Sharma | |
| 6,687,735 B1 | 2/2004 | Logston | |
| 6,925,431 B1 | 8/2005 | Papaefstathiou | |
| 6,941,341 B2 | 9/2005 | Logston | |
| 2002/0184240 A1 | 12/2002 | Volkoff | |
| 2002/0184294 A1 | 12/2002 | Volkoff | |
| 2003/0182423 A1 | 9/2003 | Shafir | |
| 2004/0139434 A1 | 7/2004 | Blythe | |
| 2004/0236860 A1 | 11/2004 | Logston | |
| 2005/0086335 A1 | 4/2005 | Liu | |
| 2005/0169173 A1* | 8/2005 | Mahdavi | ................ 370/230 |
| 2005/0256692 A1 | 11/2005 | Monin | |
| 2006/0026169 A1 | 2/2006 | Pasqua | |
| 2007/0299638 A1* | 12/2007 | Tantawi | ..................... 703/2 |

OTHER PUBLICATIONS

Y. Narahari and P. Sundarrajan, "Performability Analysis of Fork-Join Queueing Systems" The Journal of the Operational Research Society, Palgrave Macmillan Journal on behalf of the Operational Research Society, vol. 46, No. 10 (Oct. 1995), pp. 1237-1249 (plus cover). Total pp. 14. S. Daskalaki and J. MacGregor Smith, "Combining Routing and Buffer Allocation Problems in Series-Parallel Queueing Networks", Oct. 26, 2004, Springer Netherlands, vol. 125, No. 1-4 (Jan. 2004) pp. 47-68.
Tayyab, A.B and Kuhl, J.G., "Experimental Validation of Stochastic Performance Models of General Layered Task Systems," Parallel Processing, 1994. ICPP 1994. International Conference on, vol. 2, No. pp. 179-183, Aug. 15-19, 1994.

* cited by examiner

*Primary Examiner* — David R Vincent
(74) *Attorney, Agent, or Firm* — Whitham, Curtis, Christofferson & Cook, P.C.; Stephen C. Kaufman

(57) ABSTRACT

A generic queueing network model of a Web services environment is introduced. The behavior of a service is abstracted in three phases: serial, parallel and dormant, thus yielding a Serial Parallel Queueing Network (SPQN) model with a small number of parameters. A method is provided for estimated the parameters of the model that is based on stochastic approximation techniques for solving stochastic optimization problems. The parameter estimation method is shown to perform well in a noisy environment, where performance data is obtained through measurements or using approximate model simulations.

2 Claims, 7 Drawing Sheets

SYSTEM FOR DYNAMIC PERFORMANCE MODELING OF COMPUTER APPLICATION SERVICES USING A SERIAL PARALLEL QUEUEING NETWORK (SPQN) MODELER

This application is a continuation of U.S. patent application Ser. No. 11/426,089, filed Jun. 23, 2006, now issued as U.S. Pat. No. 7,493,249, and which is incorporated herein by reference.

BACKGROUND OF THE INVENTION

1. Field of the Invention

The present application generally relates to performance modeling of a complex data processing system when information about the internal structure of the system, the flow of work within the system, and the capacities of resources in the system are not available and, more particularly, to a performance model that captures delay behavior in the actual system, without being too simplistic (e.g., a single server queueing model), or too complicated (e.g., a large queueing network or simulation model).

2. Background Description

Large data processing systems, such as Web serving systems, consist of a multitude of hardware and software components that interact in a complex way. Such components include several tiers of execution units, Web application environments, and databases. The continual management and optimization of system resources in such an environment requires systems performance models that are simple enough to solve, yet representative enough to capture, in a dynamic fashion, the salient performance features of the system. Today's models are either (1) too simplistic or coarse to be useful or (2) too detailed and thus do not lend themselves to dynamic optimization at the time scale (seconds) that is needed for the management of Web serving systems.

Performance modeling and evaluation includes building a queueing model of the computer system as a whole, characterizing the workload to the computer system, and analyzing the queueing model using a workload model to obtain performance measures. Modeling a computer system involves hardware components as well as software components. The hardware components include processing units (CPU), data storage units (RAM and disks), and communication channels. Such hardware components are resources shared by concurrent tasks executing in the system. When a task needs a resource that is not available, the task will wait in a queue until the resource becomes available. The interconnection of resources, along with their multiplicities, their capacities, and corresponding queueing disciplines form the basis for building a queueing model of the system hardware. In addition, there are software resources, such as threads of execution, database locks, and communication connections. Similar to hardware resources, tasks use software resources and queue for their usage if they are not available. Thus, there are queueing models of the system software. An overall system model combines both hardware and software components. The users of system resources, hardware or software, are tasks that get generated due to requests, as in an interactive workload, or due to job submissions, as in batch or long running workload. Different types of workload exhibit different behavior, as far as the amount of resources needed and the usage pattern of such resources are concerned.

The challenge in system performance modeling is to develop a model that is efficient to solve, and yet represents the system behavior and yield accurate performance predictions. At one end of the spectrum, a very simple model is a single server queueing system. In such a model, the single server represents the system as a whole, including hardware and software resources, as a single resource. The queue holds jobs that are waiting to use the system. A job stream constitutes the arrival process to the single server queue. The analysis of such a model is rather straightforward and several performance measures such as response time, waiting time, system utilization, and throughput are easily computed. However, such a simple model assumes that jobs line up to use one resource. Thus, parallelism in resource usage, system delays, contention for multiple resources, and cyclic usage of resources are not captured. The other end of the modeling spectrum is a detailed model that includes all resources, their queueing structures and interconnections. Such a detailed model is typically solved using simulation instead of analysis. The simulation time is usually long, and thus simulation can not be used when dynamically managing the system resources based on performance predictions. A viable approach is to reduce the detailed model to a queueing network model that may be solved numerically under various simplifying assumptions. There are many other analytic techniques such as matrix-geometric techniques and diffusion approximations.

A middle ground is to develop a generic model of the computer system that captures the serialization of tasks as they contend for a resource, the parallelism of tasks as they use multiple resources in parallel, and the inherent system delays due to communication and external processing. The model should provide for the cyclic behavior of tasks and the multiple usages of resources. Furthermore, the model should be easily extended to incorporate multiple types of tasks and work loads. There should be a simple method to estimate the parameters of the model, given high-level system measurements obtained by external monitors, rather than adding instrumentation with detailed level measurement probes to applications.

SUMMARY OF THE INVENTION

It is therefore an object of the present invention to provide a model that can be used for performance prediction and system resource management.

It is another object of the invention to provide a model that is simple and efficient to solve, as well as provide accurate prediction.

This invention addresses the above problem and introduces a middle ground model. The invention considers a Web services environment and develops a generic queueing network model of such an environment. The behavior of a service is abstracted to three phases: serial, parallel and dormant, thus yielding a Serial Parallel Queueing Network (SPQN) model with a small number of parameters. The method for estimating the parameters of the model is based on stochastic approximation techniques for solving stochastic optimization problems. The parameter estimation method performs well in a noisy environment, where performance data is obtained through measurements or using approximate model simulations. The numerical results yield a useful service characterization that is based on two parameters: parallelism and activity.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
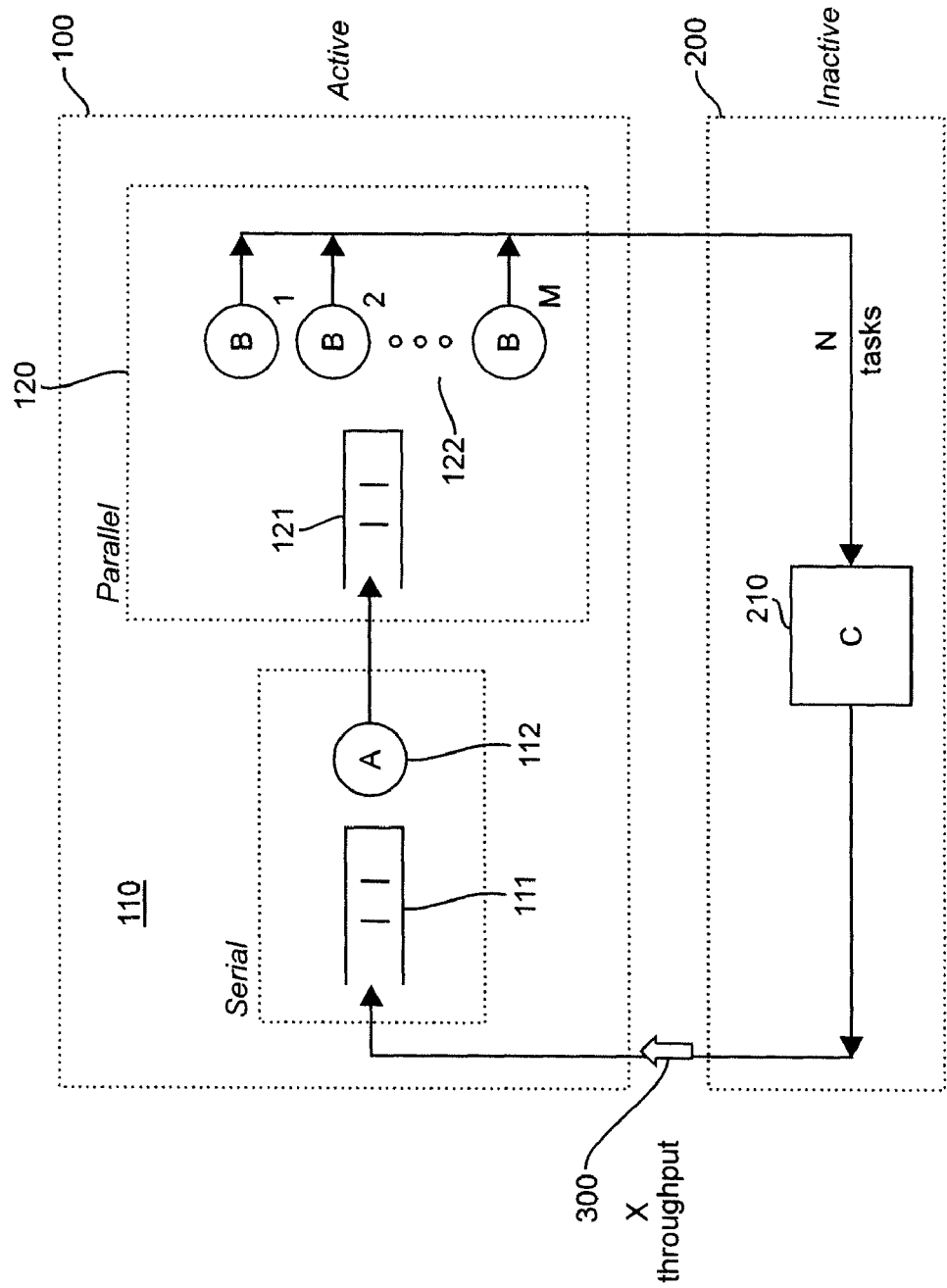
FIG. 1 is a block and schematic diagram illustrating the components of the SPQN model according to the invention.

The invention provides a system and method for dynamic performance modeling of computer application services and uses a model for performance prediction and system resource management. The system is based on a model, termed generic Series Parallel Queueing Network (SPQN) model. Referring now to the drawings, and more particularly to FIG. 1, there is illustrated the components of the SPQN model. As a request flows in a computer system, it alternates between being active 100 and inactive 200. The throughput 300 is the rate at which requests circulates between being active 100 and inactive 200. The throughput is denoted by X. The total number of requests (or tasks) in the computer system is denoted by N. A request in the active 100 state uses two kinds of generic resources: a serial resource 110 and a parallel resource 120. Usage of a resource consists of two components: contending (waiting for the availability) for the resource and actually utilizing the resource. For the serial resource 110, requests contend by waiting in a queue 111 and then utilizing the serial resource 112. The total time that a request utilizes the serial resource 112 is denoted by A. Similarly, for the parallel resource 120, requests contend by waiting in a queue 121, then utilizing a parallel resource 122. There are M instances of resource 122, so at most M requests may be utilizing the resource in parallel. The total time that a request utilizes a parallel resource 122 is denoted by B. A request in the inactive state 200 remains dormant, represented as delay 210, for an amount of time denoted by C. The dormant delay 210 models pure delay such as communication delay, disk rotation delay, or external delay for service obtained outside of the computer system (e.g. database delay if the model focuses on an application server).

Figure 2:
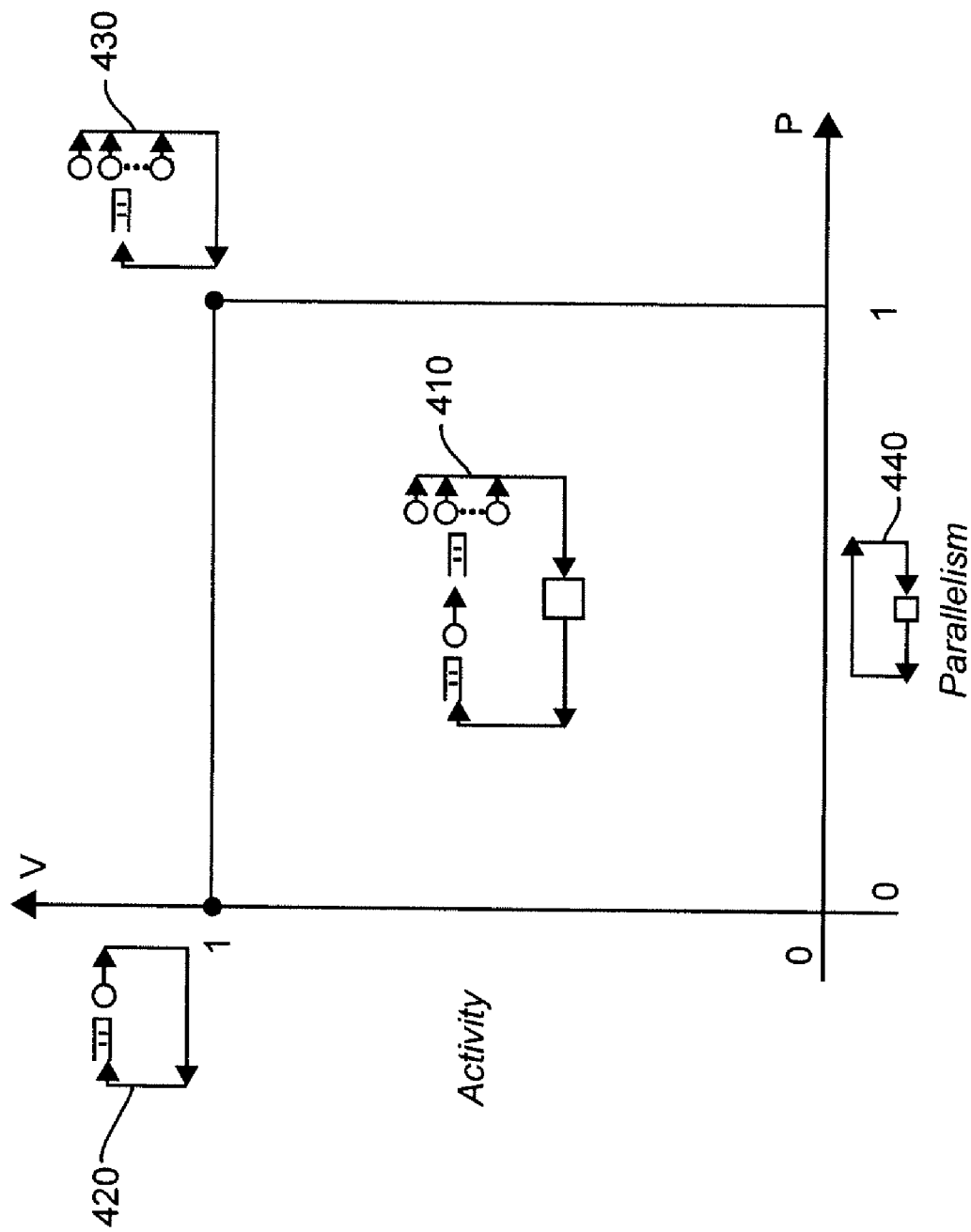
FIG. 2 is a graphical representation of the SPQN model space.

For convenience, the quantities below are defined:
Service time: $S=A+B+C$
Parallelism: $P=B/(A+B)$
Activity: $V=(A+B)/S$ The model illustrated in FIG. 1 is generic in the following sense. As the service times A, B and C vary, the measures of parallelism P and activity V change accordingly. FIG. 2 illustrates the space of all values of the measures of parallelism P and activity V. The boundary values of P, the measure of parallelism, are 0 for strictly serial execution of requests, and 1 for strictly parallel execution of requests. Any fractional value between 0 and 1 is a measure of the parallelism of the request execution. Similarly, the boundary values of V, the measure of activity, are 0 for strictly pure (load-independent) delay of requests, and 1 for strictly active and competing requests. A fractional value between 0 and 1 is a measure of the activity in the request execution. For fractional (non-zero and non-one) values of P and V, model 410 is the generic SPQN model. At the upper left corner, where P=0 and V=1, the model degenerates into a pure active serial model 420. At the upper right corner, where P=1 and V=1, the model degenerates into a pure active parallel model 430. And, at the bottom edge, where V=0, the model degenerates into a pure delay 440.

Figure 3:
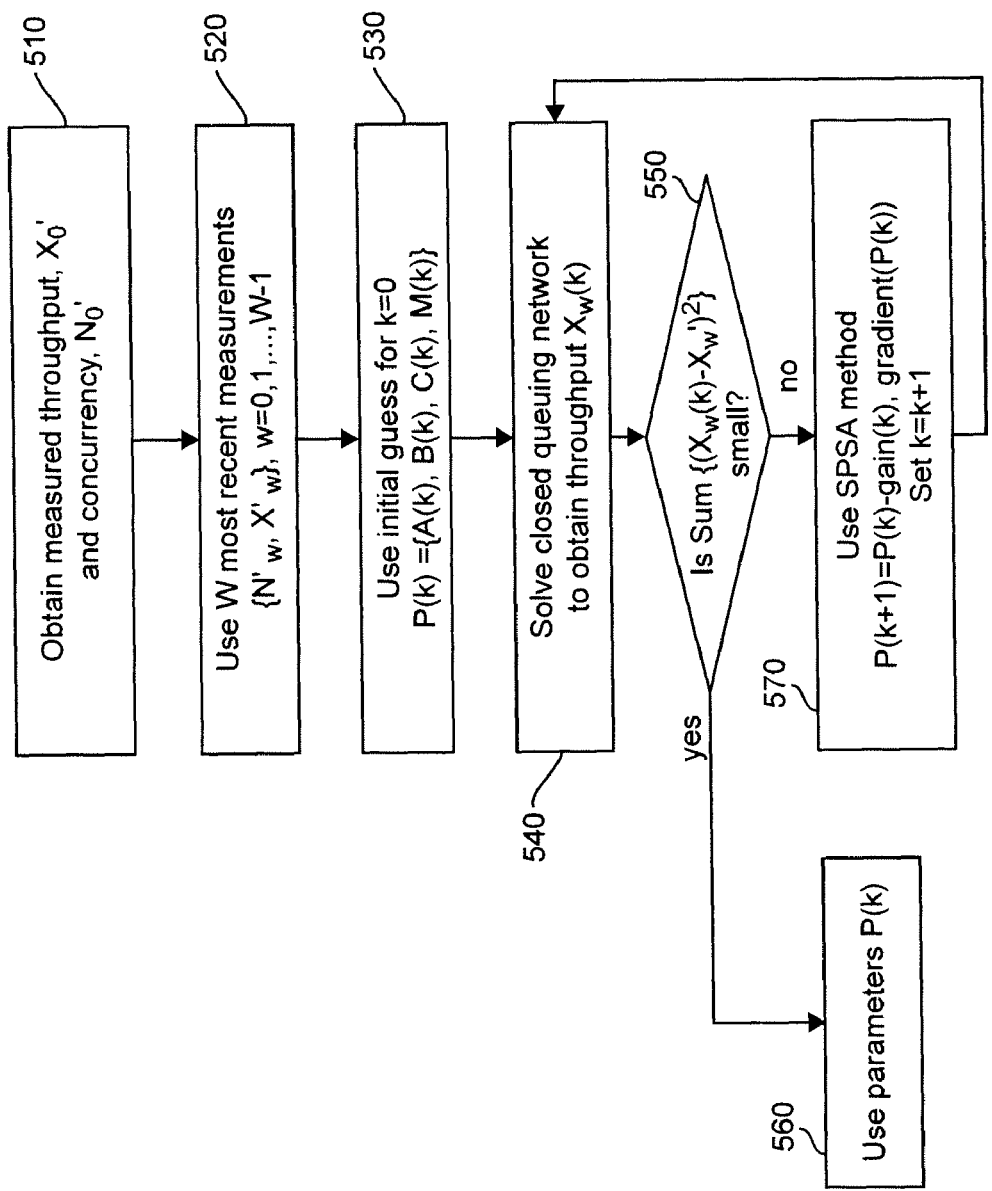
FIG. 3 is a flow diagram illustrating the method of parameter estimation implemented by the invention.

Now, a method for estimating the parameters of the generic SPQN model is described. There are four parameters: A (serial service time), B (parallel service time), C (dormant time), and M (number of parallel resources). The method for parameter estimation is based on periodic measurements of the throughput X and the concurrency N. FIG. 3 illustrates a flow chart summarizing the steps of the parameter estimation method. Monitoring agents provide periodic throughput and concurrency measurements. The parameter estimation method relies on a sequence of measurements. At the time of invocation of the method, the measured throughput ($X'_0$) and the measured concurrency ($N'_0$) are obtained at function block 510. A sliding window of the most recent W measurements, $\{N'_w, X'_w\}$, w=0, 1, ..., W−1, is updated at function block 520. A stochastic search technique, known as Simultaneous Perturbation Stochastic Approximation (SPSA), is used to estimate the parameters $P(k)=\{A(k), B(k), C(k), M(k)\}$ at step k. Initially at k=0, an initial guess based on practical knowledge or prior estimation results is used in function block 530. The SPQN is solved using Means Value Analysis (MVA) technique for analyzing closed queueing networks. The MVA solution at function block 540 results in the throughput $X_w(k)$ at step k. A test is made in decision block 550 to access closeness to the measured throughput values for all values obtained during the sliding window. If the difference between the MVA analysis using parameters P(k) and the measured throughput values is within the accepted tolerance, then P(k) are used as the parameters estimates in function block 560; otherwise, the parameters are changed in function block 570 as $P(k+1)=P(k)-gain(k).gradient(P(k))$ and the value of k is advanced by one. The quantities gain(k) and gradient(P(k)) are evaluated as per the SPSA method. Then, the process returns to function block 540 in order to solve the queueing network with the new (k+1)st values of the parameters.

So far, there has been described the SPQN generic queueing network model and the corresponding method for estimating its parameters, given that there is a single class of tasks, also referred to as traffic class. Requests in a given traffic class have similar characteristics in terms of their usage of the serial and parallel resources, degree of parallelism, dormant delay, and service time. Extension to multiple classes is straightforward. In practice, there may be different types of requests and applications, hence the service times and parallelism may differ from class to class. A multiple class SPQN is similar to a single class SPQN, except that the serial service time and dormant delays depend on the class, and the parallel queue is replicated, one per class, to allow different values of parallelism M and parallel service times for the different classes. The method for parameter estimation is extended for the case of multiple classes by having vector quantities for throughput, concurrency, and parameters, instead of scalar quantities. The MVA technique for multiple classes is used in function block 540.

Figure 4:
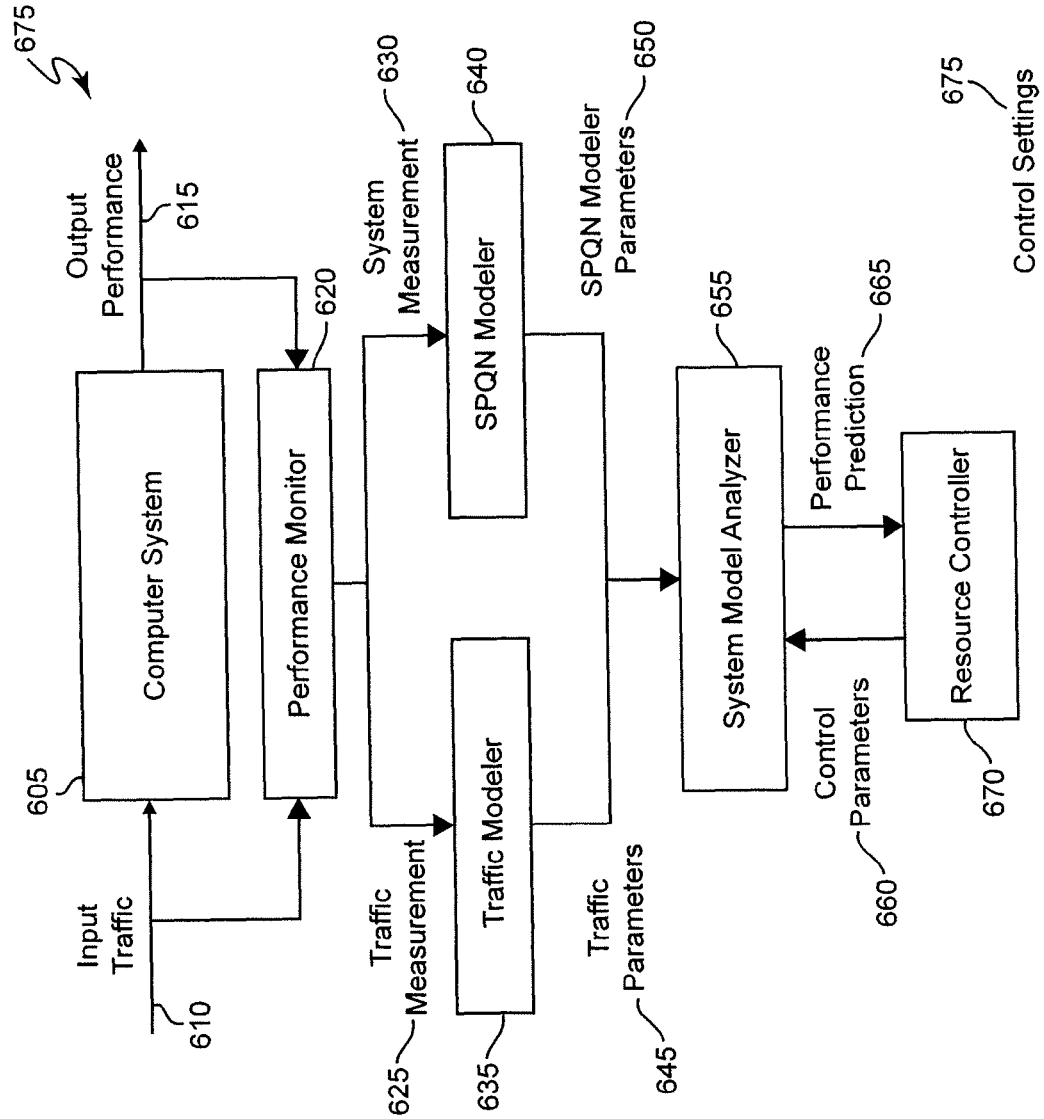
FIG. 4 is a block diagram illustrating the components of the resource management system.

A dynamic performance modeling and system resource controller system based on the method outlined above is depicted in FIG. 4. The computer system 605 being controlled runs computer application services and is subjected to an input traffic load 610 of service requests. Such requests are submitted by a number of clients, and as a result, responses from the computer system are sent back to the clients. The performance of the computer system is collected as output performance 615. Such performance includes throughput, response time of requests, and concurrency of executing requests. A performance monitor 620 continuously collects data about the input traffic load 610 and the system output performance 615. The digested data from the performance monitor 620 are provided as traffic measurements 625 and system measurements 630. Traffic measurements 625 depend on the traffic model used. In case of an open traffic model case, traffic measurements 625 consist of traffic rates. Alternatively, in a closed traffic model case, traffic measurements 625 consist of the number of active clients and the think time between receiving a response and submitting a subsequent request. The traffic modeler 635 uses the traffic measurements to build a traffic model, be it open or closed model. The SPQN modeler 640 uses the system measurements to build a SPQN model for the computer system 605, employing the method described above and illustrated in FIG. 3. The parameters P(k) 560 obtained by the SPQN modeler 640 are communicated as SPQN model parameters 650 to the system model analyzer 655. The system model analyzer 655 makes computer system performance prediction 665 based on SPQN traffic parameters 650, traffic parameters 645, and control parameters 660. Control parameters 660 depend on control management. Typically, control management is concerned with the resources allocated to the various computer application services. Such resources include threads of execution and communication and database connections. The control settings 675 of allocated resources are determined by resource controller 670 which attempts to meet pre-specified system level objectives, employing system model analyzer 655. Finally, control settings 675 are set in computer system 605 in order to achieve the pre-specified system level objectives. This process repeats periodically as the measurement data become available and there is a need for changing control settings. A typical period varies from a few seconds to several hours.

Figure 5:
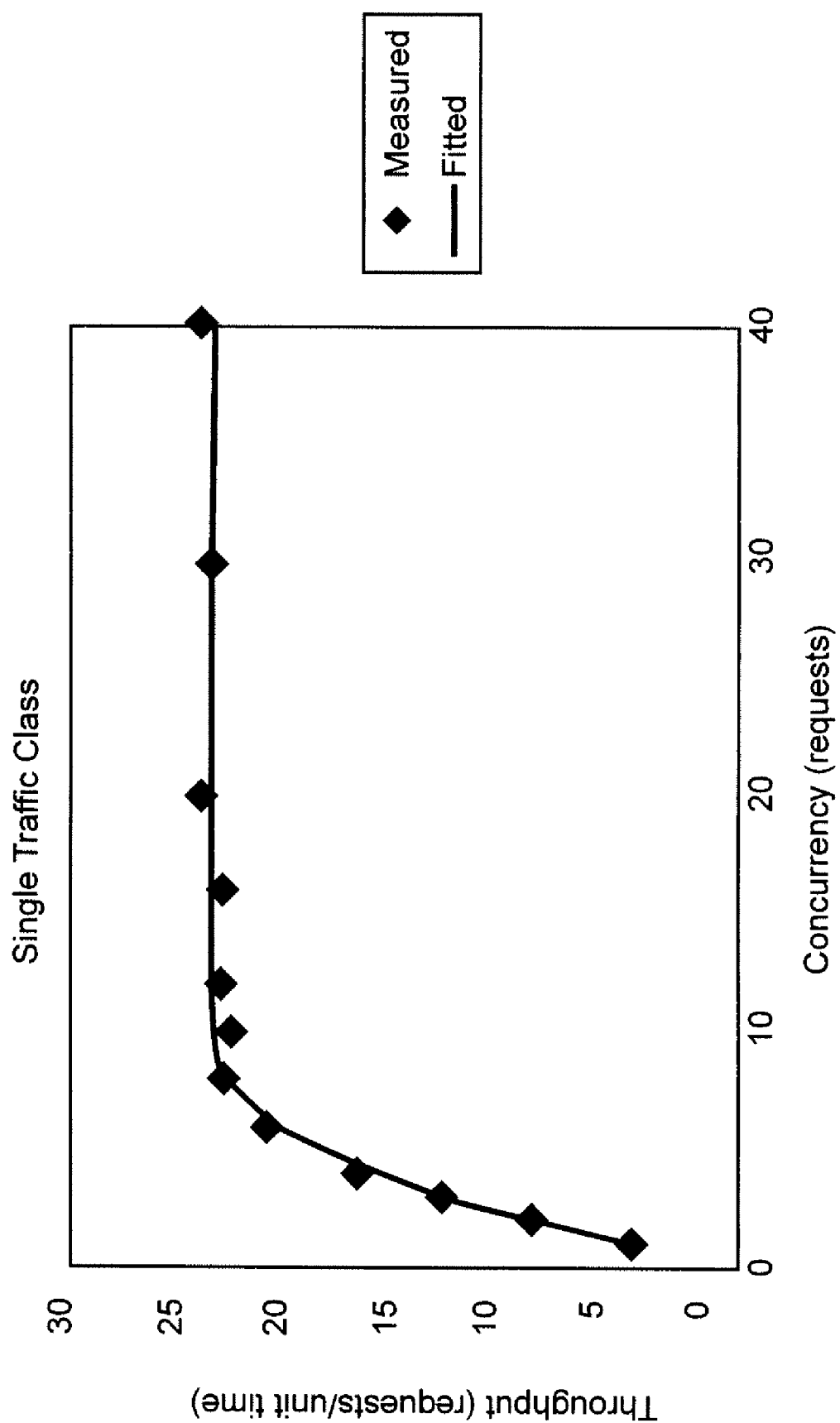
FIG. 5 is a graphical representation of the accuracy of the SPQN model using single traffic class measurements.

A demonstration of the method of the invention follows. An application service that is CPU bound is measured over a range of concurrency values ranging from one to forty. The throughput and corresponding concurrency measurements are collected. A range of twelve pair of measurements are used in the SPSA method to estimate the parameters P(k) of the SPQN model of the computer system running the application service. The service time of the application service is measured to be 200 msec at light load. An initial guess at k=0 is P(0)={A=18 msec, B=162 msec, C=20 msec, M=20}. These values yield a parallelism P=0.90 and activity V=0.90. The estimation error is defined as the square root of the sum, over the number of sample measurements, of the square of the difference between the measured throughput and the throughput obtained by analyzing the SPQN model. The relative error of the initial solution is 69.5. The final estimation of the parameters after k=500 iterations is P(500)={A=40 msec, B=119 msec, C=41 msec, M=29}. These values yield a parallelism P=0.75 and activity V=0.80. The relative error of the final estimation dropped to 1.6. FIG. 5 illustrates the throughput data that is measured for different values of concurrency (shown as individual points) along with the throughput values obtained by solving the SPQN model (shown as a continuous line) using the fitted parameters estimated above.

Figure 6:
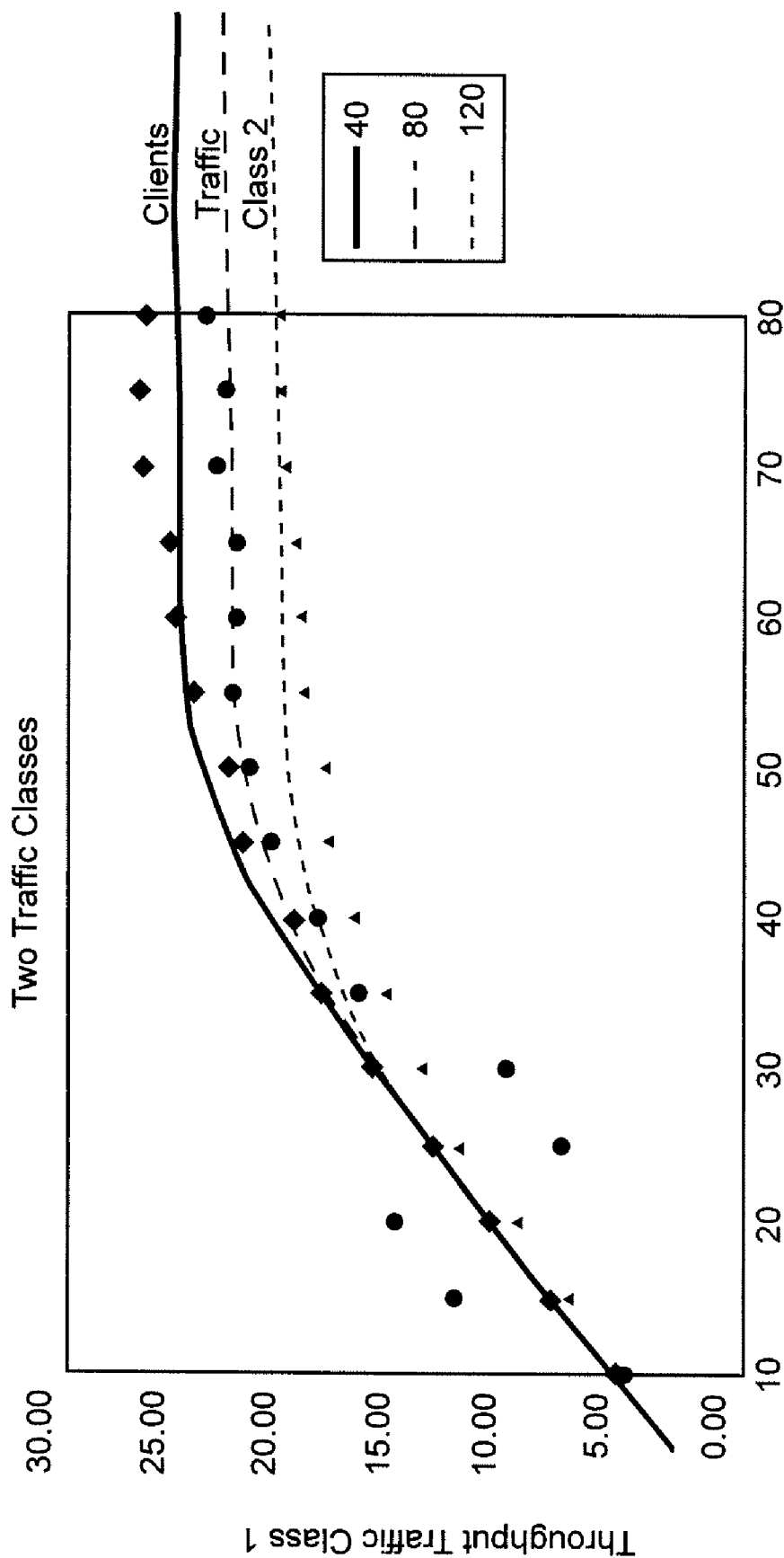
FIG. 6 is a graphical representation of the accuracy of the SPQN model, illustrating the throughput of the first class, using measurements of two traffic classes.
Figure 7:
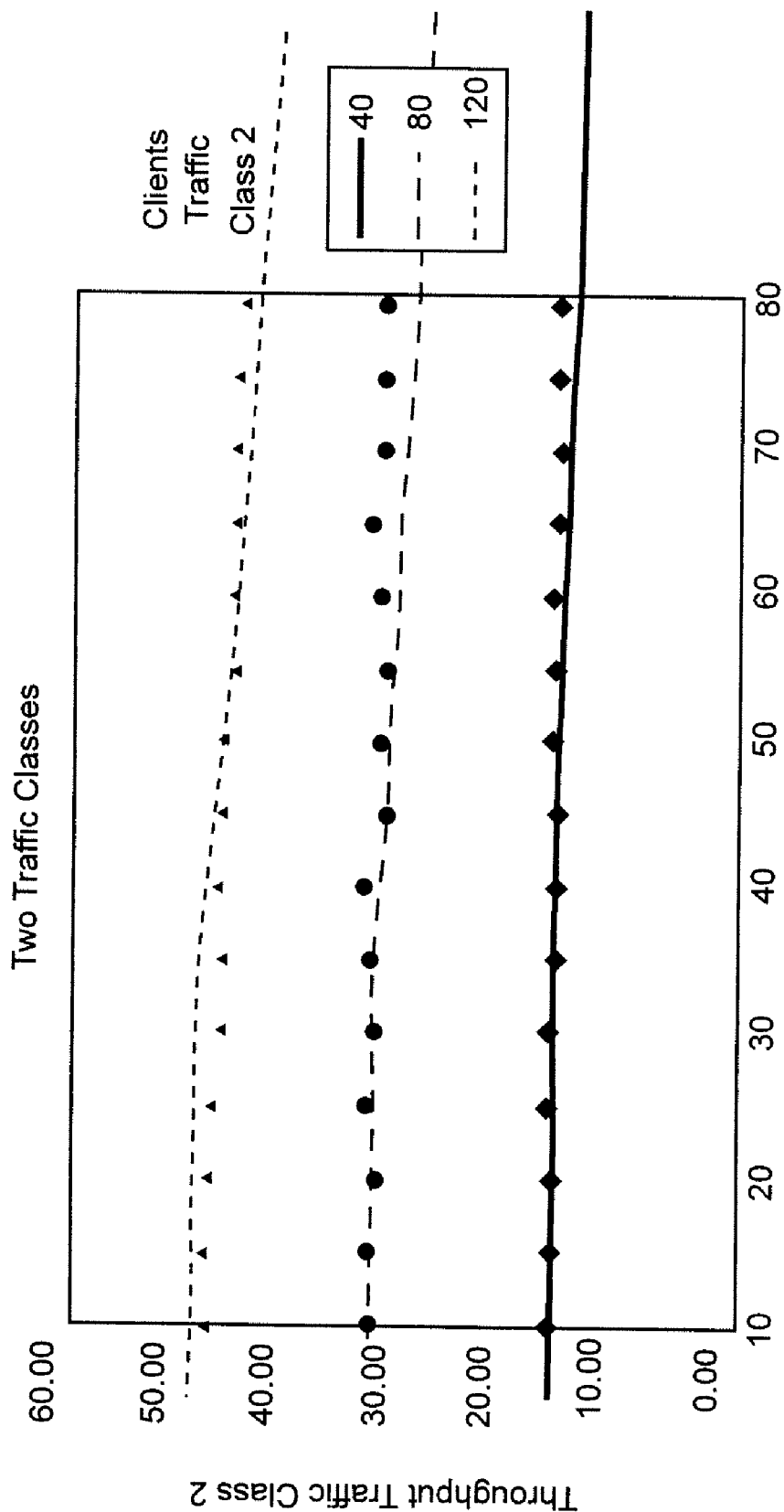
FIG. 7 is a graphical representation of the accuracy of the SPQN model, illustrating the throughput of the second class, using measurements of two traffic classes.

A second demonstration of the method of the invention with two traffic classes follows. Two simultaneous application services are considered. The first application service is CPU bound and the second application service is memory bound, hence the two resulting traffic classes have different serial and parallel resource requirements as well as dormant delay. A set on independent clients generate requests to each of the two application services. The number of clients generating class 1 traffic varies over the values 10, 30, 50, and 70 clients. The number of clients generating class 2 traffic varies over the values 40, 80, and 120 clients. The think times the two sets of clients are measured to be 1,520 msec and 1,540 msec, respectively. The throughput data is collected for each of the combinations of the number of class 1 and class 2 clients. Thus, a range of twelve pair of measurements are used in the SPSA method to estimate the parameters P(k) of the SPQN model of the computer system running the two application services. The service times of the two application services are measured to be 215 msec and 890 msec, respectively. An initial guess at k=0 is P(0)={A=31 msec, B=120 msec, C=64 msec, M=10} for class 1 and P(0)={A=9 msec, B=80 msec, C=801 msec, M=10} for class 2. These values yield a parallelism P=0.80 and activity V=0.70 for class 1 and P=0.90 and V=0.10 for class 2. The relative error of the initial solution is 9.7. The final estimation of the parameters after k=50 iterations is P(50)={A=36 msec, B=112 msec, C=67 msec, M=9} for class 1 and P(50)={A=5 msec, B=57 msec, C=828 msec, M=9} for class 2. These values yield a parallelism P-0.76 and activity V=0.69 for class 1 and P=0.92 and V=0.07 for class 2. The relative error of the final estimation dropped to 7.5. FIG. 6 illustrates the throughput data for class 1 that is measured for different values of the number of clients of class 1 and class 2 (shown as individual points) along with the throughput values obtained by solving the SPQN model using the fitted parameters estimated above. FIG. 7 illustrates the throughput data for class 2 that is measured for different values of the number of clients of class 1 and class 2 (shown as individual points) along with the throughput values obtained by solving the SPQN model (shown as continuous lines) using the fitted parameters estimated above.

A demonstration of the system of the invention follows. The system depicted in FIG. 4 is implemented to control the threads of execution allocated to three traffic classes in a computer system. Requests from the three traffic classes are serviced by the same application service. The traffic model of each class is a central server closed queueing network with population values of 20, 40, and 80 clients, respectively. The think times of the clients are 5 sec for all of the three traffic classes. The objective of the resource controller is to provide performance, measured as average response time, which is equal for all the traffic classes, relative to target performance values. The target performance values for the three traffic classes are 4 sec, 8 sec, and 16 sec, respectively. The service time of a request is 1 sec. The SPQN model has parameters P(k)={A=160 msec, B=640 msec, C=200 msec, M=10}. These values yield a parallelism P=0.8 and activity V=0.8. The resource controller employs the system model analyzer using the above parameters to find the control settings (number of threads of execution to be allocated to each of the three traffic classes) in order to achieve its objective. The resulting control settings are 10, 12, and 14 threads of execution allocated to the three traffic classes, respectively. According to the system model analyzer, these control settings yield a ratio of predicted average response time over target average response time of 0.57 for all three traffic classes.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A dynamic performance modeling and system resource controller system comprising:

a performance monitor which continuously collects data about input traffic load and system output performance of a computer system being controlled and generates traffic measurements of throughput, X, and system measurements of concurrency, N, at throughput X;

a traffic modeler which receives the generated traffic measurements, builds a traffic model and outputs traffic parameters;

a Serial Parallel Queueing Network (SPQN) modeler which receives the generated system measurements and outputs SPQN model parameter: serial service time, A, parallel service time, B, dormant time, C, and number of parallel resources, M, wherein service time, S, is equal to A+B+C, parallelism, P, is equal to B/(A+B), and activity, V, is equal to (A+B)/S;

a system model analyzer which receives the traffic parameters, the SPQN model parameters and control parameters and makes a performance prediction; and a resource controller which outputs the control parameters to the system model analyzer, the control parameters depending on control management concerned with resources allocated to various computer application services, the resource controller generating control settings for the computer system being controlled to achieve pre-specified system level objectives.

2. The dynamic performance modeling and system resource controller system recited in claim 1, wherein the system model analyzer uses a stochastic search technique to estimate the parameters $P(k)=\{A(k), B(k), C(k), M(k)\}$ solving the closed SPQN using a Mean Value Analysis (MVA) to obtain throughput and, if a difference between the MVA analysis using parameters $P(k)$ and measured throughput values are within accepted tolerance, the resource controller uses $P(k)$ as parameter estimates to generate control settings for the computer system being controlled.

* * * * *